United States Patent
Suda

(10) Patent No.: US 8,659,259 B2
(45) Date of Patent: Feb. 25, 2014

(54) STEPPING MOTOR DRIVING APPARATUS

(75) Inventor: Takeyuki Suda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 12/855,773

(22) Filed: Aug. 13, 2010

(65) Prior Publication Data
US 2011/0057600 A1   Mar. 10, 2011

(30) Foreign Application Priority Data
Sep. 4, 2009   (JP) .................................. 2009-204631

(51) Int. Cl.
*H02P 8/00* (2006.01)
(52) U.S. Cl.
USPC ........................................................ 318/696
(58) Field of Classification Search
USPC ........................................................ 318/696
See application file for complete search history.

(56) References Cited

U.S. PATENT DOCUMENTS

| | | | | |
|---|---|---|---|---|
| 5,225,756 A | * | 7/1993 | Coutu | 318/696 |
| 5,264,770 A | * | 11/1993 | Coutu | 318/696 |
| 5,742,139 A | * | 4/1998 | Kolomeitsev | 318/400.2 |
| 6,119,046 A | * | 9/2000 | Sporer | 700/12 |
| 6,806,675 B2 | * | 10/2004 | Wang et al. | 318/685 |
| 2002/0008490 A1 | * | 1/2002 | Holdaway | 318/696 |
| 2009/0206788 A1 | * | 8/2009 | Ando | 318/696 |

FOREIGN PATENT DOCUMENTS

| JP | 09-219995 A | 8/1997 |
|---|---|---|
| JP | 2007-104839 A | 4/2007 |

* cited by examiner

*Primary Examiner* — Kawing Chan
(74) *Attorney, Agent, or Firm* — Fitzpatrick, Cella, Harper & Scinto

(57) ABSTRACT

A motor driving apparatus for constant-current control of a current of a coil of a motor includes a detector detecting the current, and a controller for controlling every first cycle to feed the coil until the current reaches a target value, and to decay the current after the current reaches the target value. The controller selects, every second cycle shorter than the first cycle, between decaying the current in a first mode and decaying the current in a second mode, in which a decay rate is lower than the first mode. In addition, the controller decays the current in the first mode when the current is equal to or higher than a predetermined threshold, and decays the current in the second mode when the current is lower than the predetermined threshold.

5 Claims, 8 Drawing Sheets

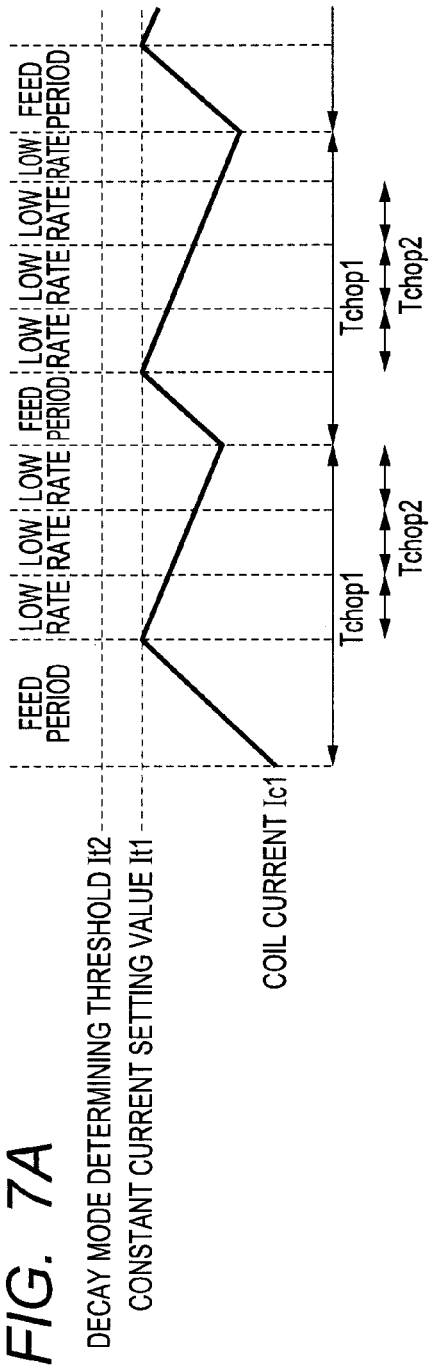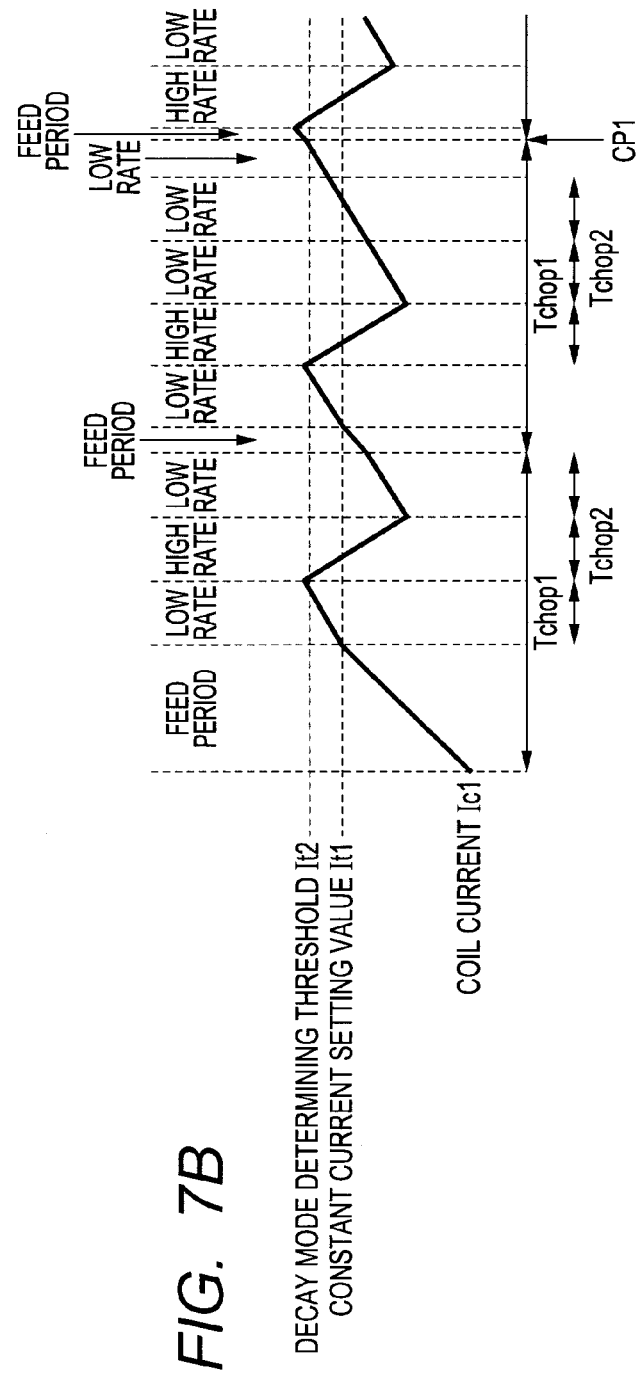

STEPPING MOTOR DRIVING APPARATUS

BACKGROUND OF THE INVENTION

1. Field of the Invention

The present invention relates to a stepping motor driving apparatus, and more particularly, to a technology of driving a stepping motor with low noise and low vibration.

2. Description of the Related Art

Up to now, a sheet transporting device within a copying machine uses a stepping motor that enables open-loop speed control and position control with high precision. A sheet transporting mechanism performs control so as to drive transport rollers located at a sheet transport path by multiple stepping motors at predetermined timing so that a sheet reaches a predetermined position at predetermined timing and predetermined speed. The multiple stepping motors repetitively start and stop within the copying machine at the same time. Because a loud noise of each motor leads to a big noise of the entire machine, it is desired to reduce the noise and vibration of the motors.

FIG. 8A is a configuration diagram of a stepping motor driving apparatus that drives a two-phase stepping motor 310 (Japanese Patent Application Laid-Open No. H09-219995). The stepping motor driving apparatus includes first to eighth switching elements 101 to 108, a phase-A coil 300 and a phase-B coil 301 for the stepping motor 310.

A two-phase excitation that is a method of driving the stepping motor is exemplified. According to input phase signals, constant-current control circuits 500 and 501 control the switching elements (FETs) 101 to 108 so that rectangular wave pulse currents different in phase by 90 degrees from each other pass through the coil 300 of the phase A and the coil 301 of the phase B, respectively. As illustrated in FIG. 8A, a coil current is allowed to flow by one H bridge circuit per one phase of the coils of the stepping motor. Hereinafter, the drive current control will be described with reference to the H bridge circuit of the phase A. FIG. 8B illustrates an example of a pulse current waveform that flows through the coil 300. A flowing direction of a coil current Ic1$p$ switches over every one-pulse period Tp, and constant-current chopping described later is conducted every chopping cycle Tchop1$p$ (FIGS. 9A and 9B) which is sufficiently shorter than the pulse period Tp so that the coil current Ic1$p$ coincides with a set current value It1$p$. For example, the chopping cycle Tchop1$p$ is a cycle of one-twentieth (1/20) of the one-pulse period Tp. Similarly, when the coil current Ic1$p$ is negative, control is made to bring an absolute value of the coil current Ic1$p$ close to the set current value It1$p$.

The constant-current chopping will be hereinafter described with reference to FIG. 9A. FIG. 9A is an enlarged diagram illustrating the coil current Ic1$p$ of FIG. 8B. In the constant-current chopping, the constant-current control circuit 500 switches over the switch states of the switching elements 101 to 104 in order to switch over a current path that flows through the coil 300, in the chopping cycle Tchop1$p$. The constant-current control circuit 500 feeds to the coil since the start of chopping cycle Tchop1$p$ until the coil current Ic1$p$ reaches the set current value It1$p$. When the coil current Ic1$p$ reaches the set current value It1$p$, the constant-current control circuit 500 enters a decay period in which the coil current Ic1$p$ is decayed so as not to exceed a target current. The decay period is terminated after a time of the chopping cycle Tchop1$p$ has passed since the feed start. The feed again starts, and a new chopping cycle Tchop1$p$ starts.

A path along which an electric current flows through the coil 300 will be described. In this example, for simplification, a description is limited to a case where the electric current that flows through the coil is in one direction. However, when the direction of the electric current is opposite, the configuration is substantially identical with that in the former except that the on/off relationship of the switching elements 101 to 104 is axisymmetric. The constant-current control includes a feed period, a low decay rate period, and a high decay rate period. The current paths correspond to the respective periods, and the switching elements 101 to 104 are controlled so as to produce those current paths. Each chopping cycle Tchop1$p$ is controlled to provide the feed period and the decay period, to thereby conduct the constant-current control. As a result of feed to the coil during the feed period, when the coil current Ic1$p$ exceeds the set current value It1$p$, the feed period switches to the decay period. The feed period continues until the coil current Ic1$p$ exceeds the set current value It1$p$. For that reason, as illustrated in FIG. 9B, a ratio of the feed period to the chopping cycle Tchop1$p$ changes depending on when the coil current Ic1$p$ reaches the set current value It1$p$. In the feed period within the chopping cycle Tchop1$p$, the switching elements 101 and 104 are turn turned on and the switching elements 102 and 103 are turn turned off, to allow an electric current to pass through a path connecting the switching element 101, the coil 300, and the switching element 104. Because the coil current Ic1$p$ during the feed period flows through a current detection resistor 410, a voltage across the current detection resistor 410 is detected to detect the coil current Ic1$p$.

A low decay rate path will be hereinafter described. The low decay rate path is a path through which an electric current flows only within the H bridge circuit, and connects the coil 300, the switching element 103, the switching element 104, and the coil 300. The low decay rate path is formed by turning on only the switching element 103. When the path switches over from the feed path to the low decay rate path, a back electromotive force occurs in the coil 300, and an electric current is allowed to pass through the coil 300 in a direction opposite to that of Ic1$p$ during the feed period. Although the switching element 104 is turned off, an inverse parallel diode is disposed between the source and the drain of the switching element (FET), and hence an electric current flows through the inverse parallel diode of the switching element 104, with the result that the electric current flows through the low decay rate path. In this way, in the low decay rate path, only the resistive components of the coil 300 and the switching element 103 and the voltage drop component caused by the inverse parallel diode included in the switching element 104 are responsible for decaying the electric current, and hence the electric current gently decays.

A high decay rate path will be hereinafter described. The high decay rate path is a path along which the coil current Ic1$p$ flows so as to charge a power source 100, and connects the switching element 104, the coil 300, and the switching element 101. The high decay rate path is formed by turning off all of the switching elements 101 to 104. When the path switches over from the feed path to the high decay rate path, a back electromotive force occurs in the coil 300, and an electric current is allowed to pass through the coil 300 in a direction opposite to that of the coil current Ic1$p$ during the feed period. Although all of the switching elements 101 to 104 are turned off, an inverse parallel diode is disposed between the source and the drain of the switching element (FET), and hence an electric current flows through the inverse parallel diodes of the switching elements 101 and 104, with the result that the electric current flows through the high decay rate path. In this way, the high decay rate path enables an electric power to be regenerated in the power source 100, and allows a power supply voltage to be applied so as to reduce the electromotive force of the coil 300. Therefore, the coil current Ic1p of the coil 300 decays at a higher rate than that of the decay caused by the low decay rate path.

The current decay is achieved by a method in which any one of the low decay rate path and the high decay rate path is used, and another method in which the high decay rate path is used for decay when the decay period starts, and the high decay rate path is switched over to the low decay rate path at predetermined timing during the decay period.

The above-mentioned operation is conducted at the coil 301 similarly, and the respective electric currents that pass through the coils 300 and 301 are subjected to constant-current control according to phase signals that are input to the constant-current control circuits 500 and 501, to thereby conduct the constant-current control of the stepping motor 310.

Further, Japanese Patent Application Laid-Open No. 2007-104839 proposes an example of the stepping motor driving apparatus that aims at more silently operating the stepping motor. In this proposal, in the constant-current control, the decay path during the decay period is switched over to any one of the high decay rate path and the low decay rate path according to whether or not a coil current value Ic1pM reaches a target current value It1pM after a predetermined feed period, to perform the current decay.

However, when the current decay is conducted by using only the low decay rate path, the electric current may not be sufficiently decayed during the current decay period due to the back electromotive force developed in the coils according to the positional relationship of a rotor and a stator, resulting in a first problem that a copper loss of the motor becomes larger due to an increase in coil current caused by the back electromotive force. Further, when only the high decay rate path is used for the current decay in order to perform sure current decay, a current ripple becomes always larger, resulting in a second problem that an iron loss generated in the motor becomes larger. Further, when any one of the high decay rate path and the low decay rate path is used for the decay path during the decay period according to whether or not the coil current Ic1p reaches the target current value It1p to perform the current decay as described above, there is a case in which the current ripple becomes larger. This is because any one of the decay paths is used in one overall decay period. The motor torque is determined according to an angle of the rotor with respect to the excitation direction of the motor and the coil current. The current ripple generated in a very short cycle with respect to the rotation of the rotor changes the torque at high speed, causing a third problem that the torque fluctuation results in noise and vibration.

SUMMARY OF THE INVENTION

The present invention has been made under the above-mentioned circumstances, and therefore an object of the present invention is to provide a stepping motor driving apparatus that is capable of controlling a coil current of a motor to be brought close to a constant current target value, and reducing noise or vibration generated by torque fluctuation as well as a loss generated in the motor.

According to the present invention, a motor driving apparatus that conducts constant-current control on an electric current that flows through a coil of a motor, includes: a detection portion that detects the electric current that flows through the coil; and a control portion that conducts control every first cycle so as to feed the electric current to the coil until a value of the electric current detected by the detection portion reaches a target value in the each first cycle, and to decay the electric current that flows through the coil after the value of the electric current detected by the detection portion reaches the target value in the each first cycle, wherein, in decaying the electric current that flows through the coil, the control portion selects, every second cycle shorter than the first cycle, one of (a) decaying the electric current that flows through the coil in a first decay mode, and (b) decaying the electric current that flows through the coil in a second decay mode of which a decay rate is lower than a decay rate in the first decay mode, and wherein the control portion decays the electric current that flows through the coil in the first decay mode when the value of the electric current detected by the detection portion is equal to or higher than a predetermined threshold, and decays the electric current that flows through the coil in the second decay mode when the value of the electric current detected by the detection portion is lower than the predetermined threshold.

Further features of the present invention will become apparent from the following description of exemplary embodiments with reference to the attached drawings.

BRIEF DESCRIPTION OF THE DRAWINGS

FIGS. 7A and 7B are diagrams illustrating examples of current waveforms according to a second embodiment.

DESCRIPTION OF THE EMBODIMENTS

Hereinafter, a mode of carrying out the present invention will be described in more detail with reference to the embodiments of a stepping motor driving apparatus.

First Embodiment

[Stepping Motor Driving Apparatus]

Figure 1A:
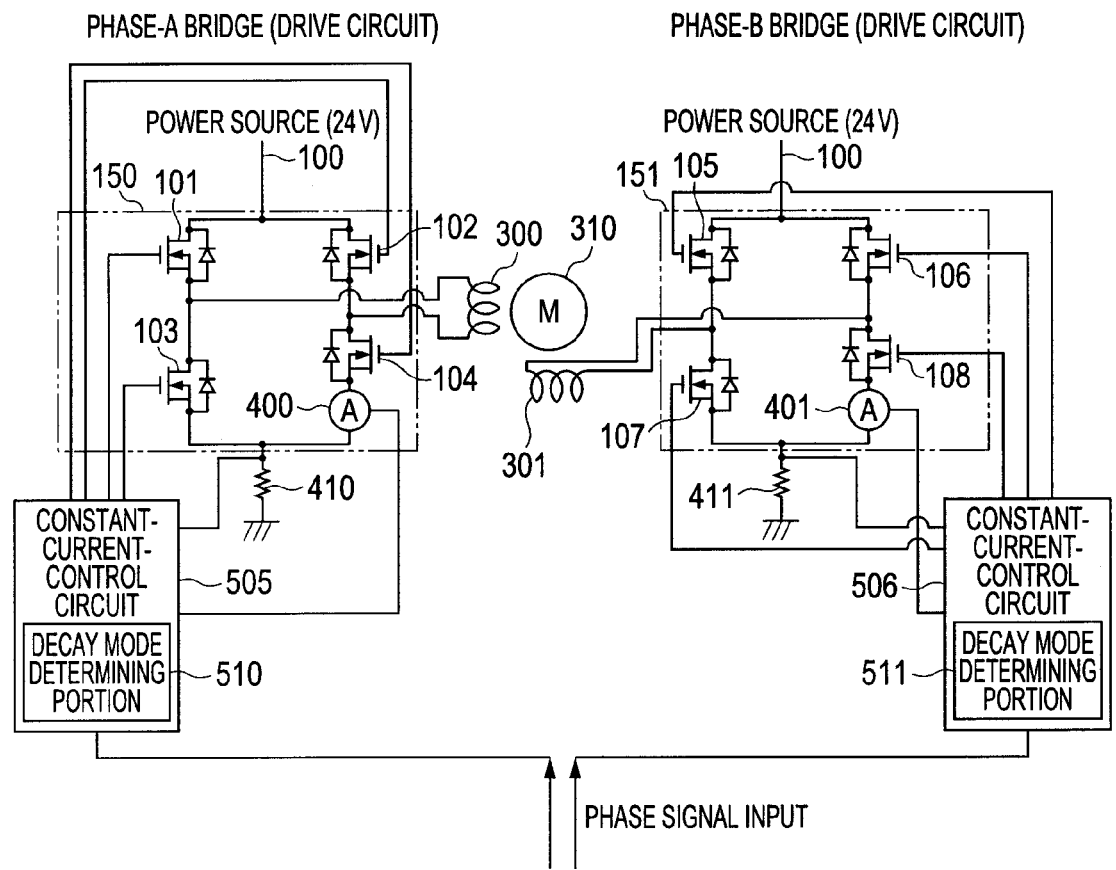
FIG. 1A is a circuit diagram illustrating a configuration of a first embodiment.
Figure 1B:
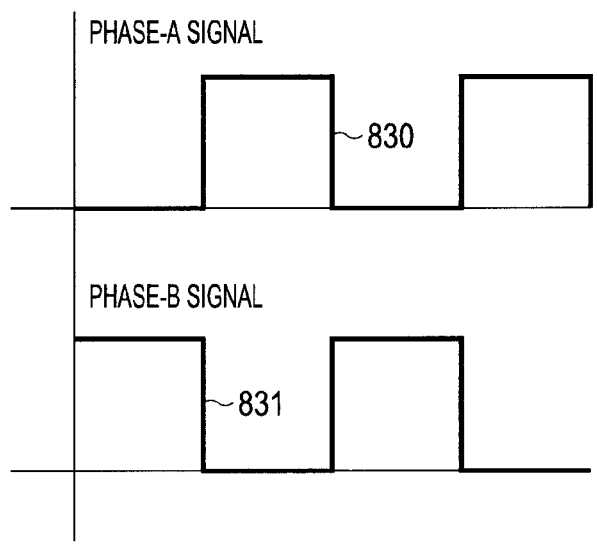
FIG. 1B is a diagram illustrating an example of a phase signal.

A stepping motor driving apparatus according to a first embodiment will be described. FIG. 1A is a diagram illustrating a configuration of the stepping motor driving apparatus according to this embodiment. In this embodiment, coils of the motor are subjected to a constant-current driving. A method of driving a stepping motor 310 will be described by taking two-phase excitation as an example. As illustrated in FIG. 1A, similarly to the related art, in this embodiment, a coil current is allowed to flow by one H bridge circuit per one phase of the coils of the stepping motor. A drive signal of the stepping motor 310 is input as a phase signal from an external controller (not shown). With the drive signal, constant-current control circuits 505 and 506 turn on/off switching elements (field-effect transistors (FETs)) 101 to 108 of the H bridge circuits, to thereby allow a predetermined electric current corresponding to the phase signal to pass through coils 300 and 301. Motor drive circuits 150 and 151 are configured to drive the motor. A waveform example of the phase signal of the two-phase excitation is illustrated in FIG. 1B. A phase-A signal 830 of FIG. 1B is input to the constant-current control circuit 505, and a phase-B signal 831 of FIG. 1B is input to the constant-current control circuit 506. In the two-phase excitation, a predetermined constant current target value It1 is given to the coils 300 and 301, and control is performed so that an electric current of +It1 flows when the excitation direction of the phase is high while an electric current of −It1 flows when the excitation direction is low.

[Constant-Current Control]

Figure 2A:
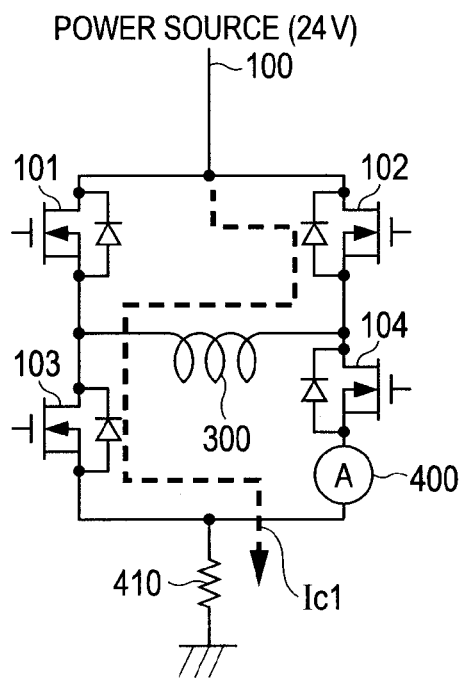
FIGS. 2A, 2B, and 2C are diagrams illustrating a feed path, a low decay rate path, and a high decay rate path according to the first embodiment, respectively.
Figure 2B:
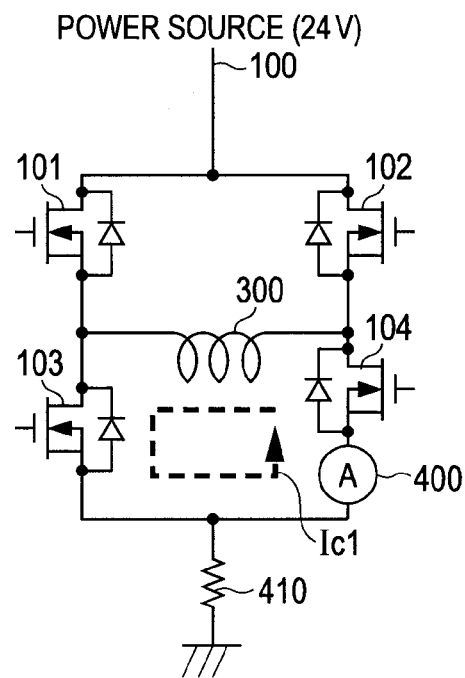
Figure 2C:
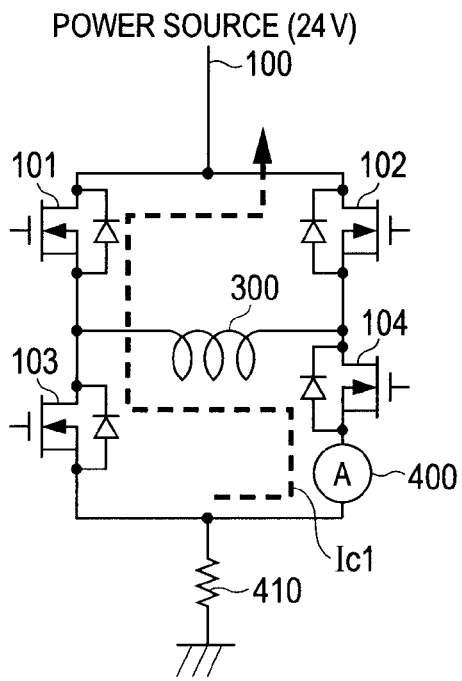

Here, the constant-current control will be described. The operation of the phase A is identical with that of the phase B, and hence only the operation of the phase A will be described. When the constant current control is conducted, there are three current paths: the feed path (FIG. 2A), the low decay rate path (FIG. 2B), and the high decay rate path (FIG. 2C) as described above. For convenience of the following description, an operation state in the feed path is called "feed mode", and an operation period in the feed path is called "feed period". An operation state in the low decay rate path is called "low decay rate mode" (second decay mode), an operation state in the high decay rate path is called "high decay rate mode" (first decay mode), and an operation period in each of the low decay rate path and the high decay rate path is called "decay period". The above-mentioned three paths (feed path, low decay rate path, high decay rate path) and the control of the switching elements are basically identical with those in the above-mentioned related art. A difference, however, exists in that a current detector 400 is added as illustrated in FIGS. 2A to 2C. The reason is as follows. When a coil current Ic1 is to be detected, the coil current Ic1 may not be detected by using only a current detection resistor 410, because no electric current flows through the current detection resistor 410 in conducting the current decay by using the low decay rate mode. Therefore, the current detector 400 is provided for detecting the coil current Ic1 in the course of decaying the electric current by using the low decay rate mode.

When only the low decay rate mode lower in decay rate than the high decay rate mode is used as the decay mode of the constant-current control, there may be a case in which the effect of a back electromotive force developed by the rotation of the motor may not decay the electric current although the coil current Ic1 exceeds the constant current target value It1. The constant current target value It1 is a constant current setting value that is set by the constant current control circuit 505. A description will be provided with reference to FIG. 3, which is an enlarged view of a period during which the electric current Ic1 exceeds the target value (constant current setting value) It1. It is apparent from FIG. 3 that the coil current Ic1 increases during the chopping cycle Tchop1p despite the low decay rate mode. This is because an electric current flows through the coil 300 due to a back electromotive force of the motor, and the back electromotive force increases along with rotation of the motor, and therefore the coil current Ic1 also increases.

Figure 4A:
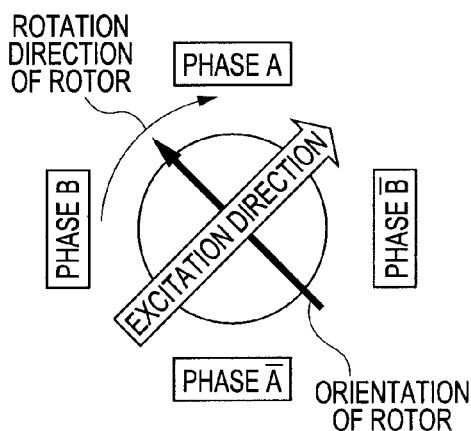
FIGS. 4A and 4B are diagrams each illustrating an excitation direction of a stepping motor, and an orientation of a rotor.
Figure 4B:
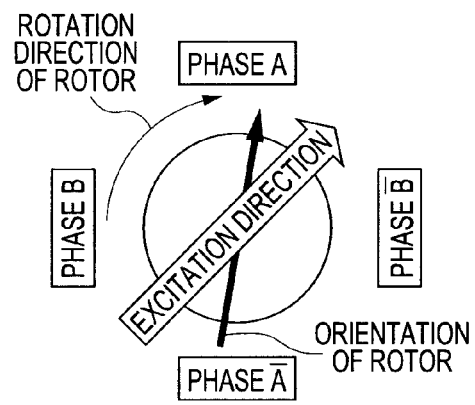

FIGS. 4A and 4B each illustrate an excitation direction and an orientation of the rotor during rotation of the stepping motor. A rotation state illustrated in FIG. 4A is a state where the rotor is rotating toward the excitation direction. At this time, a torque developed in the motor is generated in a direction in which the rotor is rotated. The excitation direction in FIGS. 4A and 4B is based on a sum of attractions caused by both the coils of the phase A and the phase B, and the torque is generated so that the orientation of the rotor is brought into line with the excitation direction. When attention is paid to the coil of only the phase A, in the state of FIG. 4B, the rotor flows over the position of a magnetic pole of the phase A, and the torque generated by only the phase A is in a direction of reducing the speed of the rotor. In this case, attention is paid to only the coil of the phase A. When the rotation is advanced from a position facing the position of the magnetic pole of the phase A, a magnetic flux that crosses the coil of the phase A is decreased. Therefore, the back electromotive force developed in the coil 300 of the phase A is generated in a direction opposite to that in the state of FIG. 4A. The back electromotive force is a voltage in the same direction as that of the power source 100, and the back electromotive force allows the coil current Ic1 to continuously pass even in a state where no supply voltage is applied.

Figure 3:
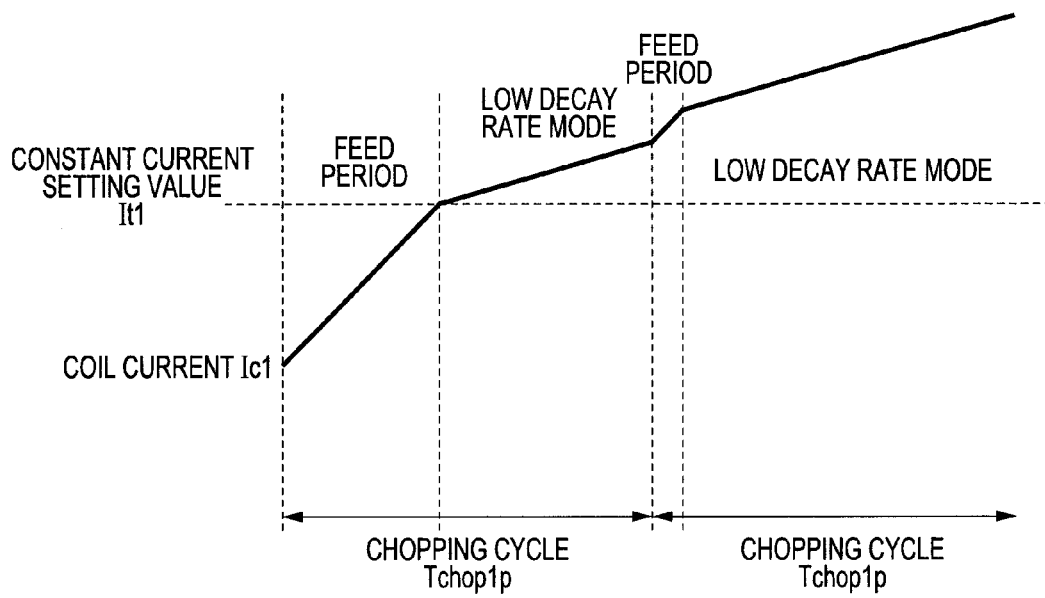
FIG. 3 is a diagram illustrating an example of a current waveform.

As described above, there may be formed a waveform illustrated in FIG. 3 which has a period during which the coil current Ic1 exceeds the set current value It1 and flows when the electric current is decayed by using the low decay rate mode, depending on the states of the rotor and the stator. In order to control the coil current Ic1 to be brought close to the set electric current value It1 in this state, there is a method by which the high decay rate mode is used for the current decay mode. In the case of using the high decay rate mode, the supply voltage is applied to the coil 300 of the motor during the decay period, in a direction opposite to that of the voltage which has been applied to the coil 300 during the feed period. In this situation, the back electromotive force developed in the motor acts to return the electric current to the power source side, which leads to an operation of regenerating the coil current Ic1 in the power source. In the low decay rate mode, the back electromotive force developed in the coil 300 is cancelled only by resistive components of the coil 300 and the switching element 103, and by voltage drop component generated by the forward voltage of an inverse parallel diode included in the switching element 104. On the contrary, when the high decay rate mode is used, the coil current Ic1 may be rapidly decayed by the supply voltage.

[Current Detection]

A method of the current detection will be described. As illustrated in FIGS. 2A and 2C, because the coil current Ic1 always flows through the current detection resistor 410 in the feed mode and the high decay rate mode, the coil current Ic1 may be obtained according to the voltage of the current detection resistor 410. On the other hand, the coil current Ic1 that flows in the low decay rate mode of FIG. 2B circulates in the H bridge circuit, and does not pass through the current detection resistor 410. For this reason, the coil current Ic1 in the low decay rate mode may not be detected by the current detection resistor 410, and hence the current detector 400 (current detector 401 for the phase B) included in the H bridge circuit is used to detect the coil current Ic1.

A decay mode determination portion 510 is included in the constant-current control circuit 505, and a decay mode determination portion 511 is included in the constant-current control circuit 506. The decay mode determination portions 510 and 511 have the same function. The decay mode determination portion 510 detects the coil current Ic1 based on output signals of the current detector 400 and the current detection resistor 410. The decay mode determination portion 510 compares a decay mode determining threshold It2, which is a current threshold for selecting the decay mode, with the coil current Ic1, to thereby determine the decay mode to be used under the constant-current control. Under the constant-current control, the constant-current control circuit 505 switches between the feed mode and the decay mode, and turns on/off the switching elements 101 to 104 according to the mode. The constant current target value It1 and the decay mode determining threshold It2 may be configured to be externally changeable during the operation. For example, the constant-current control circuit 505 may be provided with an input terminal through which a voltage signal is input from the outside to set the constant current target value It1 and the decay mode determining threshold It2.

In this embodiment, the decay modes are switched over multiple times during the decay period within one chopping cycle Tchop1. This may solve the problem of the insufficient current decay when only the low decay rate mode is used and the problem of an increase in current ripple when only the high decay rate mode is used. Accordingly, the coil current Ic1 may be controlled to be brought close to the constant current target value It1.

[Decay Mode Switching Process]

Figure 5:
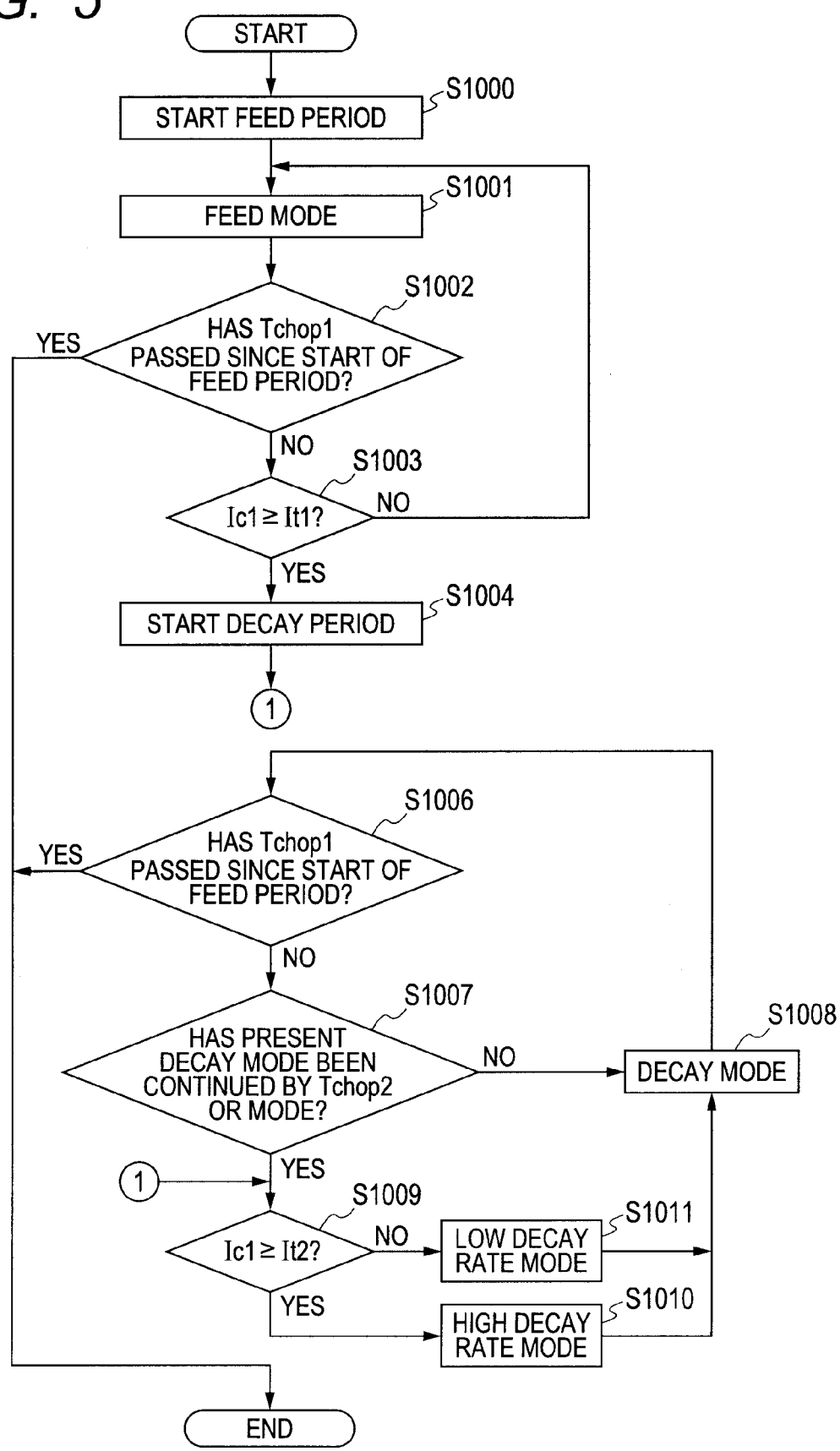
FIG. 5 is a flowchart illustrating an operation of the first embodiment.

A method of switching over the decay mode multiple times within one chopping cycle Tchop1 will be described with reference to a flowchart of FIG. 5, and FIGS. 6A and 6B. The flowchart of FIG. 5 illustrates processing to be performed by a central processing unit (CPU) (not shown) included in the decay mode determination portion 510. However, the same processing as that of this flowchart may be performed by hardware such as an application specific integrated circuit (ASIC).

The chopping cycle Tchop1 is required to be sufficiently shorter than a one-pulse period Tp. The current ripple of the coil current Ic1 becomes smaller as Tchop1 is shorter. However, when Tchop1 is too short, the number of switching per unit time is increased so that the switching loss increases. Therefore, an appropriate value needs to be set. Tchop2 is a cycle for switching over the decay mode multiple times in the decay period after the feed period in Tchop1 terminates. For this reason, Tchop2 is determined so that Tchop1 includes the feed period and multiple decay periods Tchop2. It is desired that Tchop2 is, for example, about 1/10 to 1/5 of Tchop1. In this embodiment, Tchop2 is about 1/5 of Tchop1. The Tchop1 period is a first period (first cycle) resulting from dividing the one-pulse period of the pulse current that flows through the coil of the stepping motor, into multiple periods. The Tchop1 period includes the feed period and the decay period. The Tchop2 period is a second period (second cycle) resulting from further dividing the decay period into multiple periods. The feed period falls within the first period, which lasts until the current value of the coil exceeds the constant current setting value after the feed of the coil is started at the same time as the start of the first period. The decay period follows the feed period. During the decay period, the electric current of the coil is decayed. A length of the feed period in the Tchop1 period is determined according to a period of time in which the coil current Ic1 reaches the constant current target value It1. Therefore, for example, when the coil current Ic1 does not reach the constant current target value It1 during the feed, the decay may not be conducted.

In Step 1000 (hereinafter referred to as S1000), the constant-current control circuit 505 starts the feed, and in S1001, the feed is conducted in the feed mode. In S1002, the constant-current control circuit 505 determines whether or not Tchop1 has passed since the feed is started, and terminates the processing when it is determined that Tchop1 has passed. The result of determination made by the constant-current control circuit 505 in S1002 becomes YES when the coil current Ic1 has never reached the constant current target value It1 within the period of Tchop1 since the feed is started. When the constant-current control circuit 505 determines in S1002 that Tchop1 has not passed, the constant-current control circuit 505 determines in S1003 whether or not the coil current Ic1 has reached the constant current target value It1. When the constant-current control circuit 505 determines that the coil current Ic1 has reached the constant current target value It1, the period is shifted to the decay period in S1004. That is, the processing is advanced to S1009 in order to determine a first decay mode during the decay period.

When the decay mode determination portion 510 determines in S1009 that the coil current Ic1 is equal to or larger than the decay mode determining threshold It2, the decay mode determination portion 510 selects in S1010 the high decay rate mode illustrated in FIG. 2C in order to obtain a required decay amount. When the decay mode determination portion 510 determines in S1009 that the coil current Ic1 is smaller than the decay mode determining threshold It2, the decay mode determination portion 510 selects in S1011 the low decay rate mode illustrated in FIG. 2B in order to slow the decay. When S1009 is executed immediately after the feed period ended, the processing is always shifted to S1010 because the coil current Ic1 is equal to or larger than the decay mode determining threshold It2. In S1008, the constant-current control circuit 505 executes decay in the decay mode selected by the decay mode determination portion 510 in S1010 or S1011. When the high decay rate mode is selected, the constant-current control circuit 505 turns off all of the switching elements 101 to 104, so that an electric current caused by the back electromotive force developed in the coil 300 is allowed to pass through the power source 100 from the ground. When the low decay rate mode is selected, the constant-current control circuit 505 turns on only the switching element 103 while turning off the switching elements 101, 102, and 104, so that the electric current caused by the back electromotive force developed in the coil 300 is circulated within the H bridge circuit.

Then, in S1006, the constant-current control circuit 505 determines whether or not Tchop1 has passed since the feed is started, and when the constant-current control circuit 505 determines that Tchop1 has passed, the constant-current control circuit 505 ends the processing during the decay mode, and again executes S1000, to thereby start a subsequent feed period. When the constant-current control circuit 505 determines in S1006 that Tchop1 has not passed, the constant-current control circuit 505 determines in S1007 whether or not Tchop2 has passed since the current decay is started in the current decay mode. This is a determination for switching over the decay mode every time Tchop2 flows. When the constant-current control circuit 505 determines in S1007 that Tchop2 has not passed, the constant-current control circuit 505 continues the current decay operation in S1008. When the constant-current control circuit 505 determines that Tchop2 has passed, the decay mode determination portion 510 determines in S1009 the decay mode to be used in the subsequent operation.

In this way, the decay mode is switched over multiple times within the chopping cycle Tchop1 so that the current ripple may be reduced regardless of the rotation state of the motor, to thereby suppress a fine torque fluctuation, which enables a reduction in noise and vibration caused by the current ripple. The coil current Ic1 is controlled to be brought close to the set current value It1, to thereby prevent an increase in copper loss, which is otherwise caused by an increased in coil current Ic1 due to the back electromotive force of the motor.

Figure 6A:
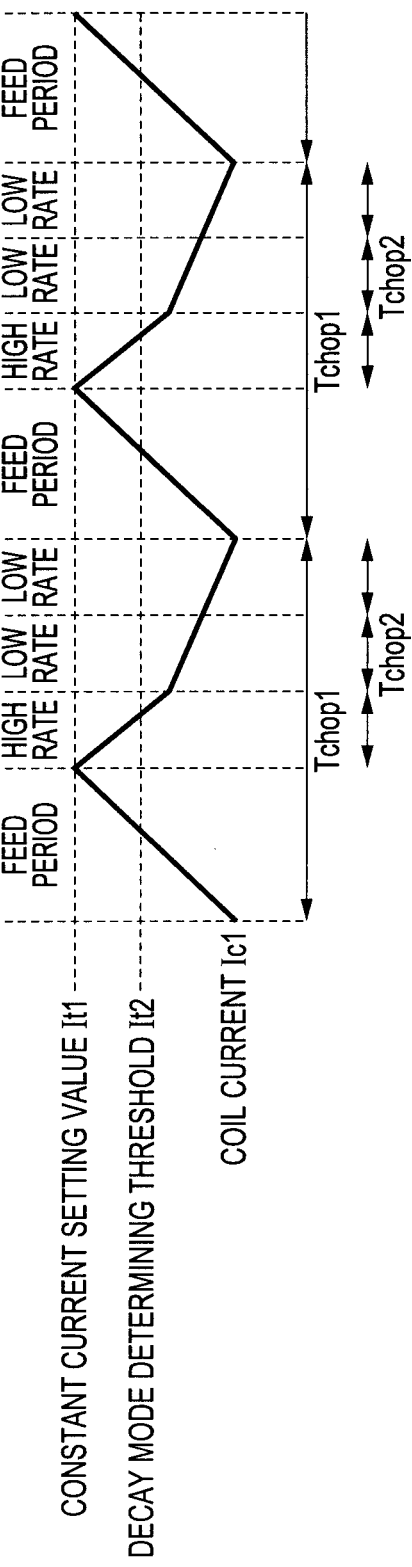
FIGS. 6A and 6B are diagrams illustrating examples of current waveforms according to the first embodiment.
Figure 6B:
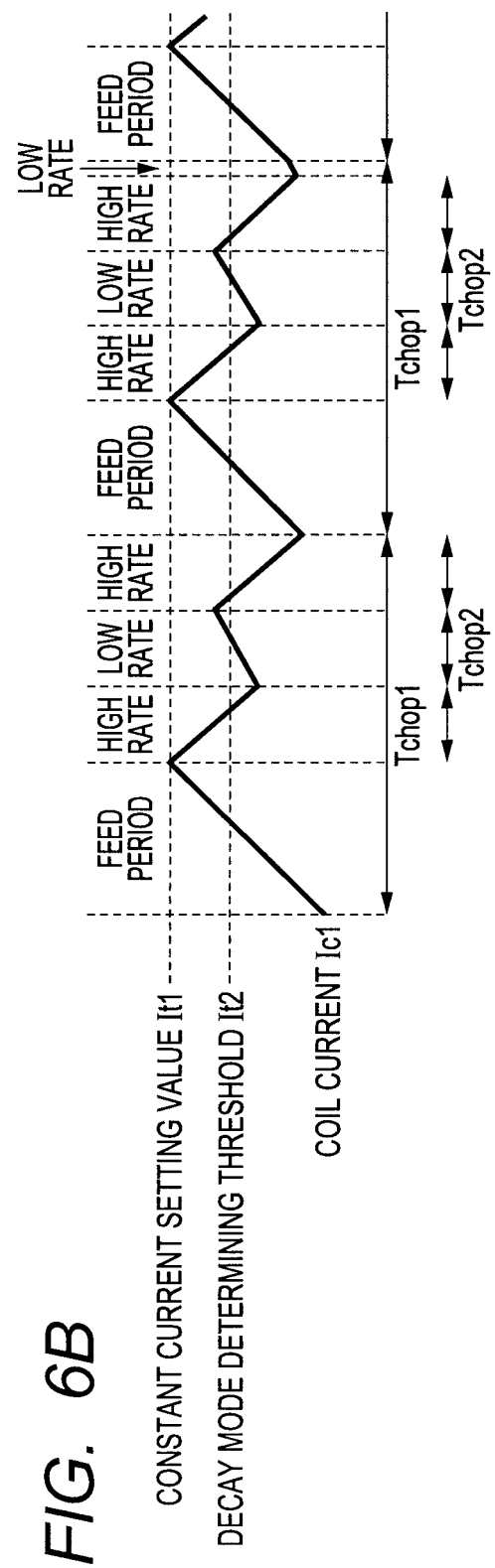
Figure 8A:
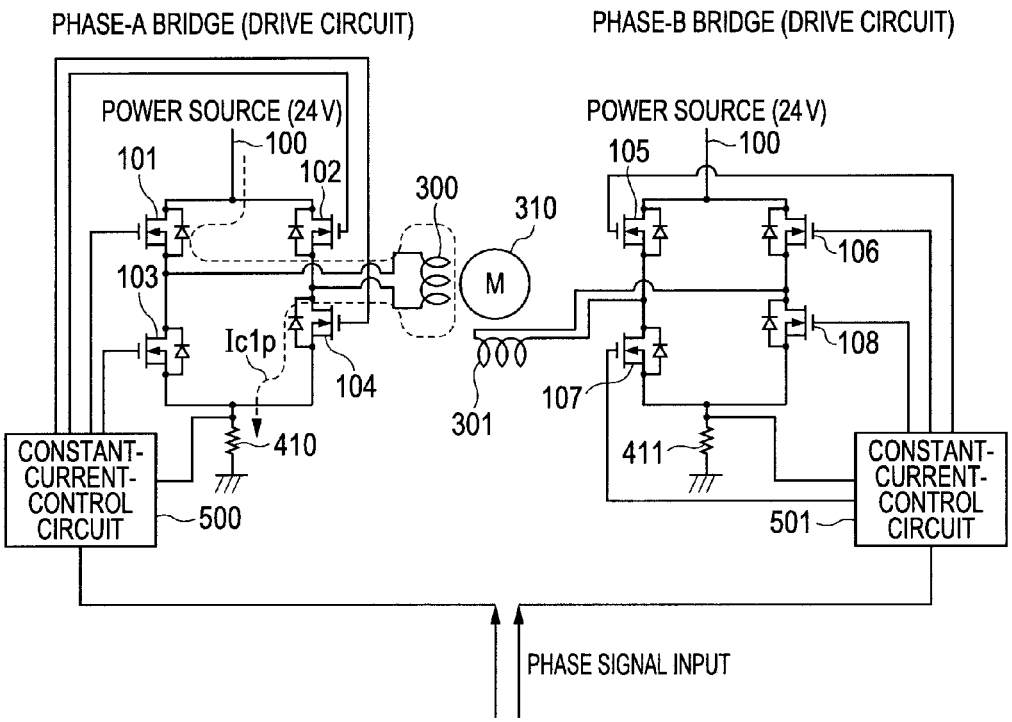
FIG. 8A is a circuit diagram illustrating a configuration of a related art.
Figure 8B:
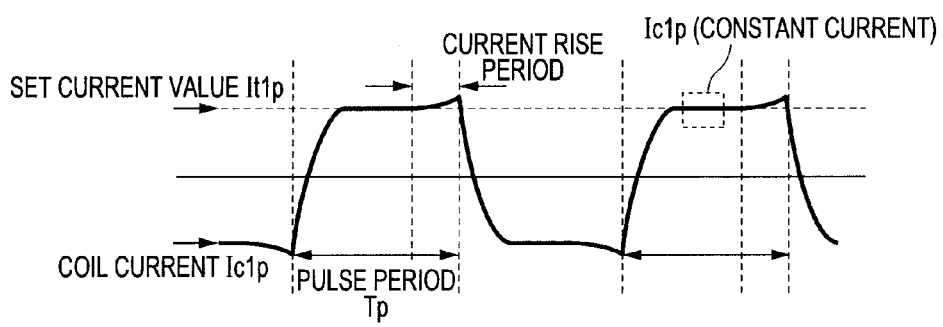
FIG. 8B is a diagram illustrating a coil current.
Figure 9A:
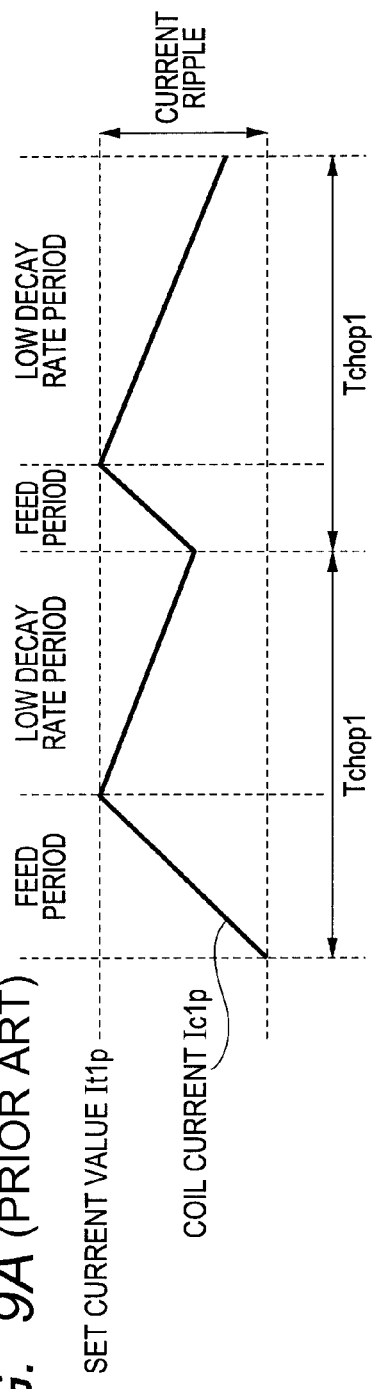
FIGS. 9A and 9B are diagrams illustrating examples of coil current waveforms of the related art.
Figure 9B:
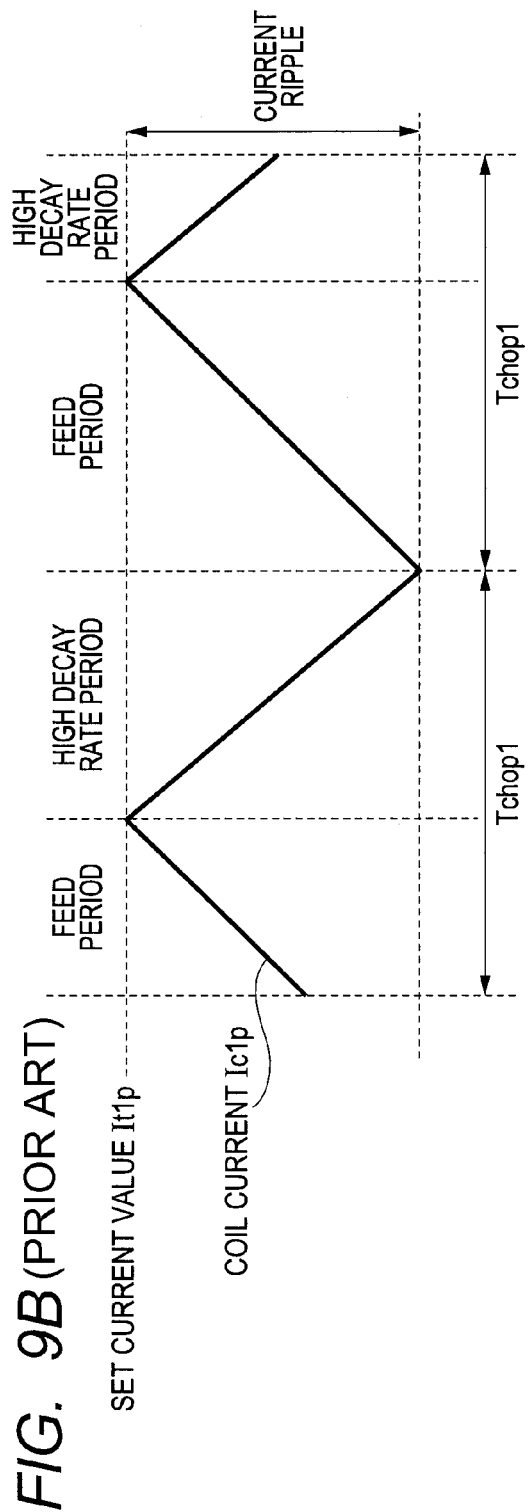

In a waveform example illustrated in FIG. 6A, the decay mode determination by the decay mode determination portion 510 is executed three times after the feed period. Meanwhile, in FIG. 6B, the decay mode determination is executed four times in the decay period after the second feed period. In this way, the number of decay mode determinations in Tchop1 varies according to a change in length of the feed period with respect to the chopping cycle Tchop1, and an appropriate decay mode may be selected according to the magnitude of the coil current Ic1. In this embodiment, two-phase excitation is used as the excitation, but the excitation system is not limited to the two-phase excitation.

In the above-mentioned embodiment, the current detector 400 is connected in series to the switching element 104. Alternatively, the current detector 400 may be connected in series to the coil 300. In this case, the current detector connected in series to the coil 300 performs the same function as that of the current detectors 400 and 410 in the above-mentioned embodiment. In the above-mentioned embodiment, control is made so that the electric current is circulated on the switching elements 103 and 104 side of the H bridge circuit in the low decay mode. Alternatively, control is made so that the electric current is circulated on the switching elements 101 and 102 side of the H bridge circuit by turning on only the switching element 102. In this case, the current detector 400 is connected in series to the switching element 102, or connected in series to the coil 300.

As described above, according to this embodiment, the coil current of the stepping motor can be controlled to be brought close to the constant-current target value. The current ripple of the coil current generated by the constant-current control is reduced, to thereby reduce the noise and vibration to be generated by torque fluctuation and the loss to be generated by the motor.

Second Embodiment

A stepping motor driving apparatus according to a second embodiment will be described. The same structures as those in the first embodiment are denoted by identical symbols, and their description is omitted. This embodiment is different from the first embodiment in that, as illustrated in FIGS. 7A and 7B, the decay mode determining threshold It2 is set to be larger than the current set value (constant current setting value) It1, and the low decay rate period is selected immediately after the feed period.

In a waveform of FIG. 7A, when the current decay is executed in the low decay rate mode during the decay period immediately after the feed period, the coil current Ic1 is appropriately decayed. For comparison, when the decay mode determining threshold It2 is set to be smaller than the current set value It1, as illustrated in FIG. 6A, the current ripple is larger than that in this embodiment because the first current decay in the current decay period is conducted in the high decay rate mode. Even in a situation where a sufficient current decay is not obtained in the low decay rate mode, as illustrated in FIG. 7B, decay in the high decay rate mode is conducted after the decay rate is reduced in the low decay rate mode immediately after the feed period so that the current ripple is kept small, to thereby enable an excellent constant-current control.

Referring to FIG. 5, the processing in the feed mode is conducted between S1000 in which the constant-current control circuit 505 starts the feed and the processing of S1004. Therefore, strictly speaking, the feed period always exists within the chopping cycle Tchop1. In the above-mentioned example where the feed period is short, the feed period is provided as CP1 of FIG. 7B, which illustrates that the feed period is very short. However, in the first embodiment, the high decay rate mode is used for current decay immediately after the decay period is started, and hence electric power is regenerated during the decay in the high decay rate mode. On the contrary, in this embodiment, electric power is not regenerated, and hence the power efficiency tends to be slightly lower than that in the first embodiment.

As described above, according to this embodiment, the current ripple may be made smaller than that in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-204631, filed Sep. 4, 2009, which is hereby incorporated by reference herein in its entirety.

What is claimed is:

1. A motor driving apparatus that conducts constant-current control on an electric current that flows through a coil of a motor, the motor driving apparatus comprising:

a detection portion that detects the electric current that flows through the coil; and a control portion that conducts control every first cycle so as to feed the electric current to the coil until a value of the detected electric current reaches a target value, to perform a first decay process, which decays the electric current that flows through the coil, after the value of the detected electric current reaches the target value, by a first decay mode in a second cycle shorter than the first cycle, and to perform a second decay process, which decays the electric current that flows through the coil, after the first decay process, by the first or a second decay mode every second cycle, wherein a decay rate in the first decay mode is higher than a decay rate in the second decay mode, and wherein in the second decay process, the control portion decays the electric current that flows through the coil in the first decay mode when the value of the electric current detected by the detection portion is equal to or higher than a predetermined threshold, with the predetermined threshold being lower than the target value, and decays the electric current that flows through the coil in the second decay mode when the value of the electric current detected by the detection portion is lower than the predetermined threshold.

2. A motor driving apparatus according to claim 1, further comprising an H bridge circuit configured to feed to the coil from a power source, wherein the control portion controls, in the first decay mode, the H bridge circuit so that an electric current generated by a back electromotive force developed in the coil flows from a ground to the power source, and the control portion controls, in the second decay mode, the H bridge circuit so that the electric current generated by the back electromotive force developed in the coil circulates in the H bridge circuit.

3. A motor driving apparatus according to claim 2, wherein the detection portion detects the electric current that circulates in the H bridge circuit.

4. A motor driving apparatus according to claim 3, wherein the H bridge circuit comprises:

a first switching element that is disposed between one end of the coil and the power source;

a first diode that is connected in inverse parallel to the first switching element;
a second switching element that is disposed between an other end of the coil and the power source;
a second diode that is connected in inverse parallel to the second switching element;
a third switching element that is disposed between the one end of the coil and the ground;
a third diode that is connected in inverse parallel to the third switching element;
a fourth switching element that is disposed between the other end of the coil and the ground; and
a fourth diode that is connected in inverse parallel to the fourth switching element.

5. A motor driving apparatus according to claim 1, wherein the motor comprises a stepping motor, and
wherein the first cycle comprises a plurality of first cycles included in one period of a pulse current passing through the coil.

* * * * *